(12) United States Patent
Tokuyama

(10) Patent No.: US 11,917,341 B2
(45) Date of Patent: Feb. 27, 2024

(54) CONTROL METHOD FOR PROJECTOR AND PROJECTOR

(71) Applicant: SEIKO EPSON CORPORATION, Tokyo (JP)

(72) Inventor: Tetsuro Tokuyama, Yufu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/867,762

(22) Filed: Jul. 19, 2022

(65) Prior Publication Data
US 2023/0015137 A1  Jan. 19, 2023

(30) Foreign Application Priority Data
Jul. 19, 2021  (JP) ................................ 2021-118577

(51) Int. Cl.
*H04N 9/31* (2006.01)

(52) U.S. Cl.
CPC ......... *H04N 9/3185* (2013.01); *H04N 9/3188* (2013.01)

(58) Field of Classification Search
CPC ............................ H04N 9/3185; H04N 9/3188

USPC ........................................................... 353/69
See application file for complete search history.

(56) References Cited

U.S. PATENT DOCUMENTS

| 2019/0219907 A1* | 7/2019 | Kurota | ................. H04N 9/3185 |
| 2022/0038670 A1* | 2/2022 | Saigo | ................... H04N 9/3147 |

FOREIGN PATENT DOCUMENTS

| JP | 2012-151584 A | 8/2012 |
| JP | 2018-170556 A | 11/2018 |
| JP | 2020-122888 A | 8/2020 |

* cited by examiner

*Primary Examiner* — Jerry L Brooks
(74) *Attorney, Agent, or Firm* — Dority & Manning, P.A.

(57) ABSTRACT

A control method for a projector includes, executing a first mode to generate a projection image projected onto a display surface by modifying a shape of an input image, accepting a change operation to the input image for changing a size of a display image displayed as the projection image is projected on the display surface or a position of the display image on the display surface, during the execution of the first mode, and shifting from the first mode to a second mode to control a change to the input image based on the change operation, when the change operation is accepted.

8 Claims, 19 Drawing Sheets

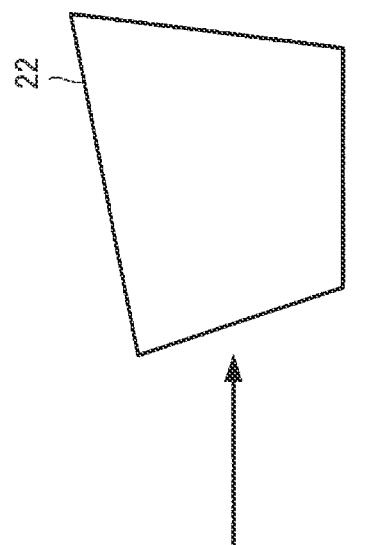
FIG. 4A
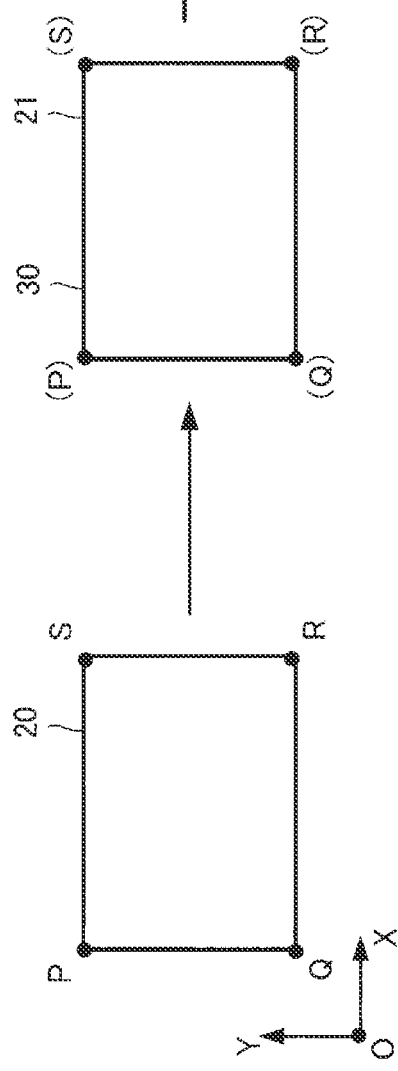
FIG. 4B
FIG. 4C
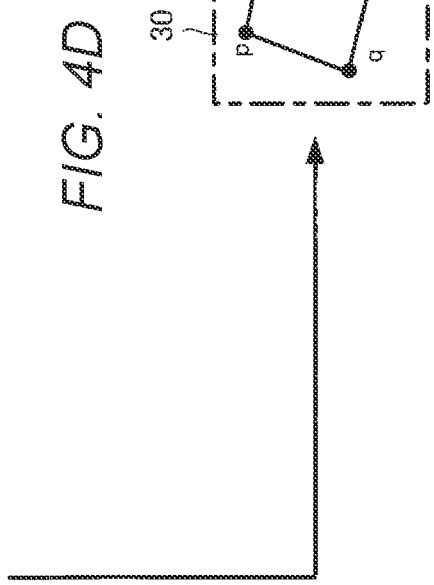
FIG. 4D
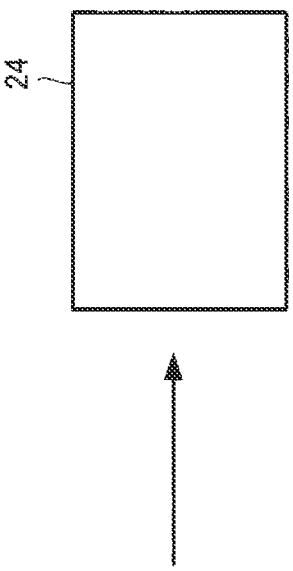
FIG. 4E

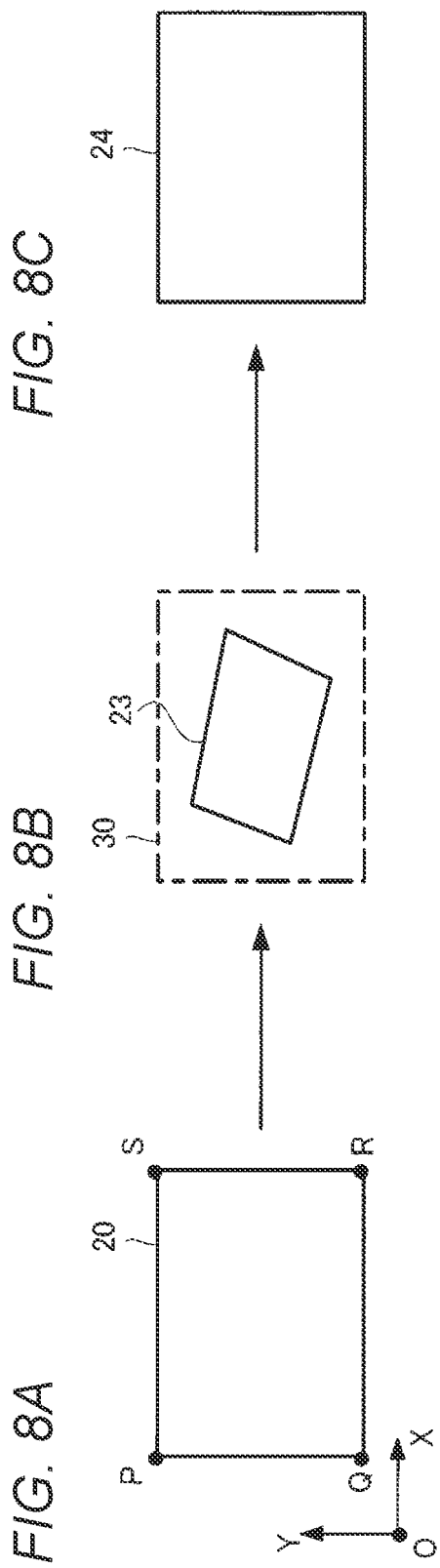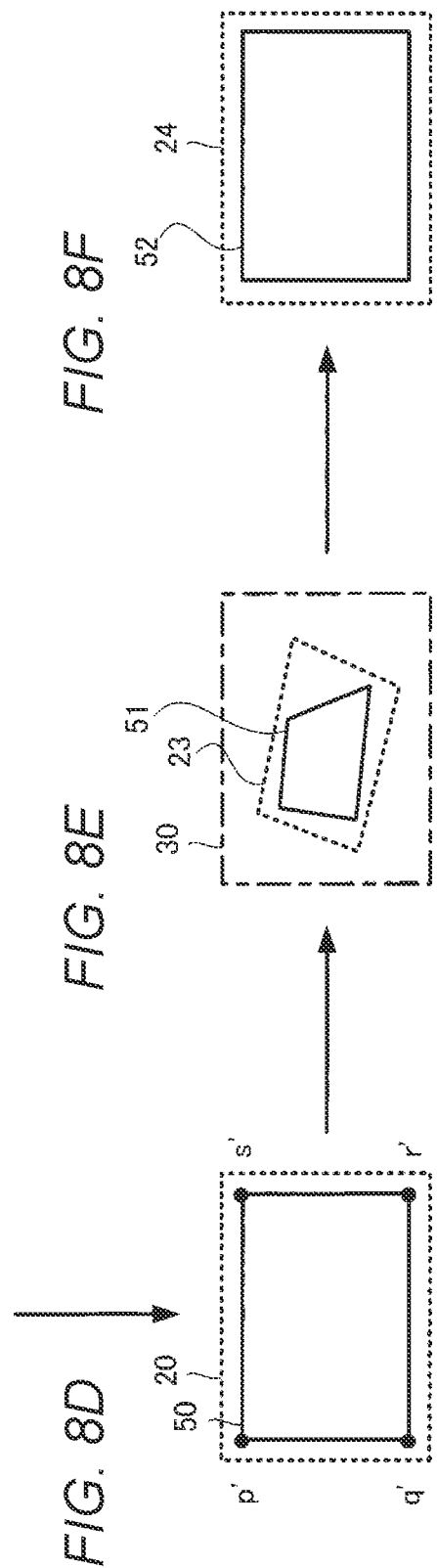

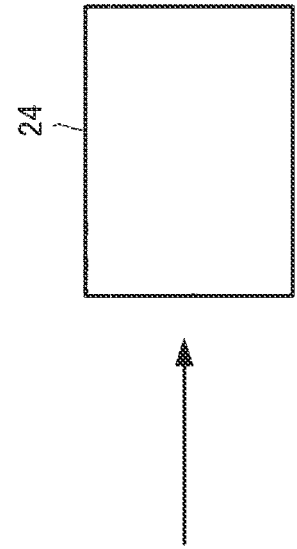
FIG. 9A
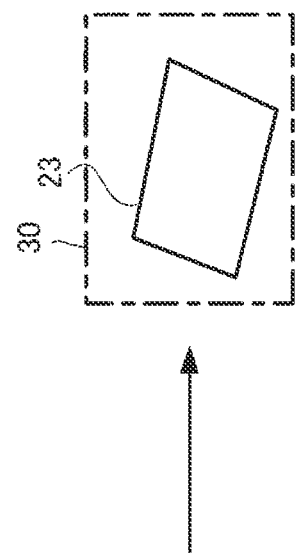
FIG. 9B
FIG. 9C
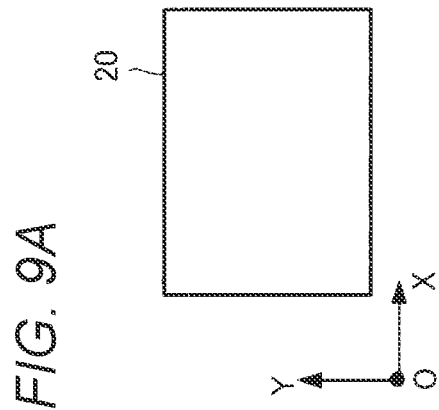
FIG. 9D
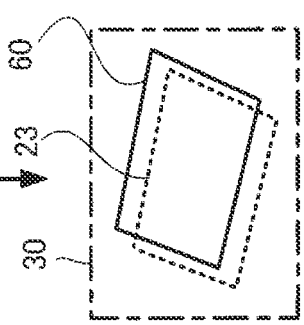
FIG. 9E

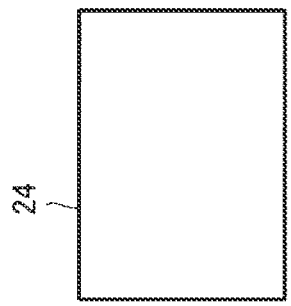
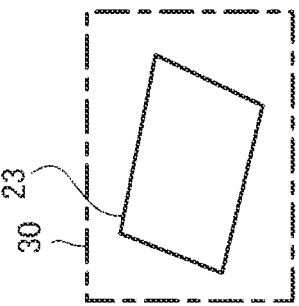
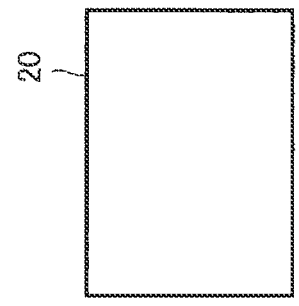
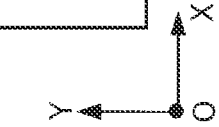
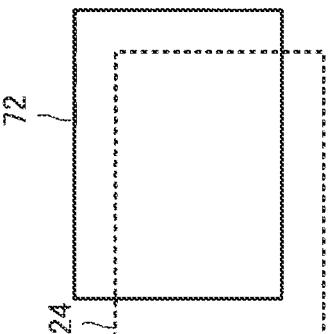
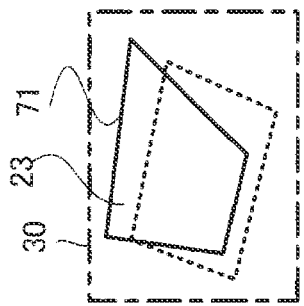
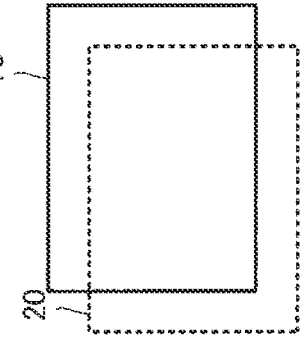

CONTROL METHOD FOR PROJECTOR AND PROJECTOR

The present application is based on, and claims priority from JP Application Serial Number 2021-118577, filed Jul. 19, 2021, the disclosure of which is hereby incorporated by reference herein in its entirety.

BACKGROUND

1. Technical Field

The present disclosure relates to a control method for a projector, and a projector.

2. Related Art

When configuring various settings for a projector, a setting screen for configuring the settings may be superimposed on a display image displayed on a display surface by the projector projecting a projection image. A user performs an operation using the setting screen superimposed on the display image and thus sets up the projector. The function of displaying the setting screen for the projector or a message from the projector, on the display surface, is generally referred to as an OSD (on-screen display).

For example, JP-A-2020-122888 discloses a projector displaying a menu that enables a lens setting and an image quality setting in the form of an OSD. In the projector according to JP-A-2020-122888, different menus are displayed between when the projector is in a normal mode and when the projector is in a mode specialized in the adjustment of the projection image, shifted from the normal mode when the lens is replaced.

In the technique according to the JP-A-2020-122888, the menu screens displayed in the normal mode and in the mode specialized in the adjustment of the projection image include a menu using the functions of digital zoom, digital shift, and geometric correction. When the user of the projector according to JP-A-2020-122888 wants to use the digital zoom function while using the geometric correction function, for example, the user cannot access the digital zoom function while using the geometric correction function. Therefore, the user needs to temporarily end the use of the geometric correction function, return to the menu screen, and access the digital zoom function from the menu screen. As the user must move back and forth between items included in the menu screen, there is room for improvement in convenience.

SUMMARY

A control method according to an aspect of the present disclosure is a control method for a projector projecting a projection image on a display surface. The control method includes: executing a first mode in which a shape of an input image is modified to generate the projection image; accepting a change operation to the input image for changing a size of a display image displayed as the projection image is projected on the display surface or a position of the display image on the display surface, during the execution of the first mode; and shifting from the first mode to a second mode in which a change to the input image based on the change operation is controlled, when the change operation is accepted.

A projector according to another aspect of the present disclosure is a projector projecting a projection image on a display surface. The projector includes: a storage device storing a control program; and a processing device. The processing device reads out and executes the control program from the storage device, thus executes a first mode in which a shape of an input image is modified to generate the projection image, accepts a change operation to the input image for changing a size of a display image displayed as the projection image is projected on the display surface or a position of the display image on the display surface, during the execution of the first mode, and shifts from the first mode to a second mode in which a change to the input image based on the change operation is controlled, when the change operation is accepted.

BRIEF DESCRIPTION OF THE DRAWINGS

FIGS. 4A to 4E are explanatory views for geometric correction by a projection image generation unit.

FIGS. 8A to 8F are explanatory views for the case where a display image is enlarged or reduced using an image processing method according to the embodiment.

FIGS. 9A to 9E are explanatory views for the case where a display image is moved using the image processing method according to the comparative example.

FIGS. 10A to 10F are explanatory views for the case where a display image is moved using the image processing method according to the embodiment.

DESCRIPTION OF EXEMPLARY EMBODIMENTS

A control method and a projector according to an embodiment will now be described with reference to the drawings. In each illustration, the dimension and scale of each part is made different from reality, where appropriate. The embodiment described below is a preferable specific example and therefore includes various technically preferable limitations. However, the scope of the present disclosure is not limited to the embodiment unless the description below includes a description that the present disclosure is limited in a particular way.

1. Configuration According to Embodiment

Figure 1:
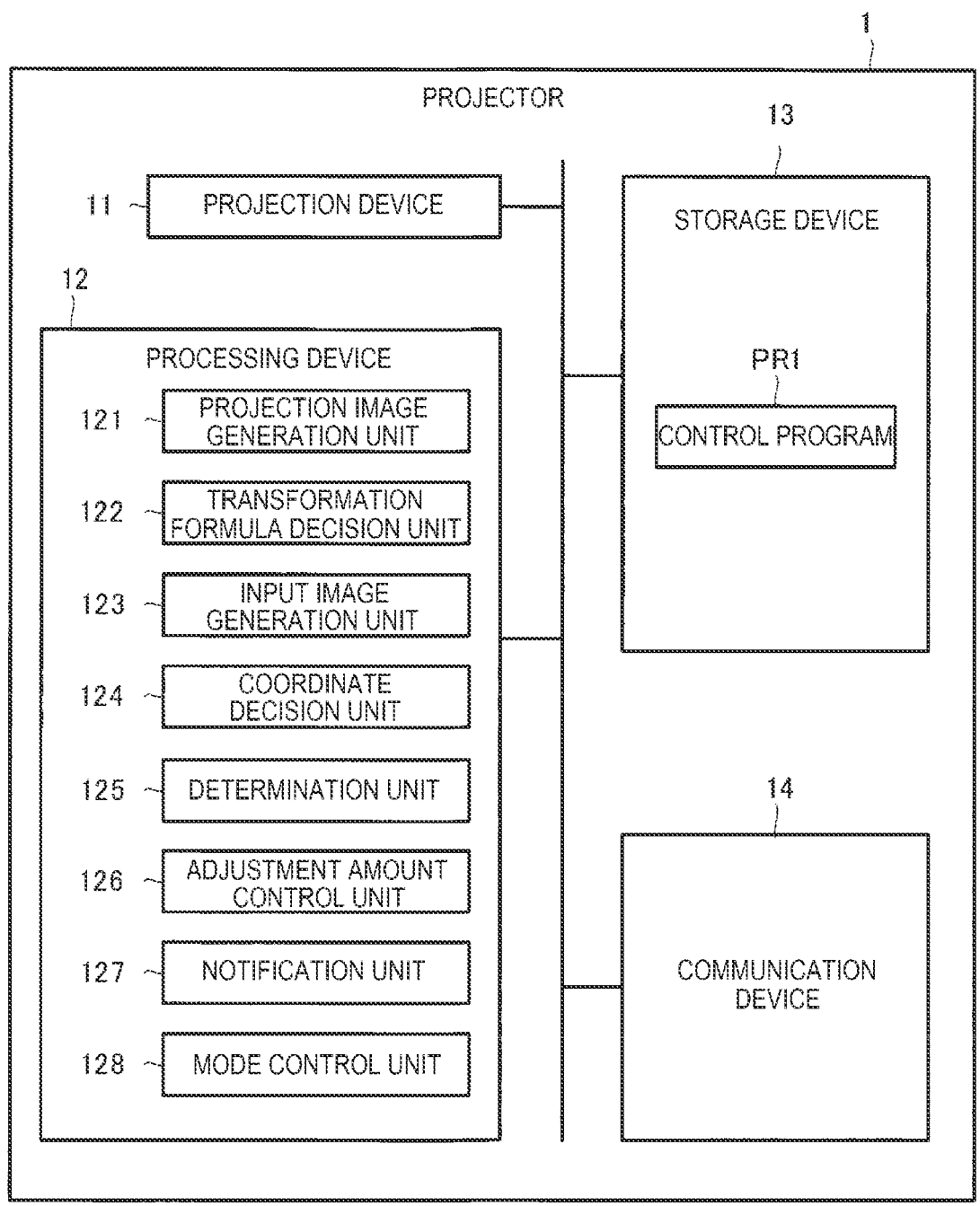
FIG. 1 is a block diagram showing the configuration of a projector according to an embodiment.
Figure 2:
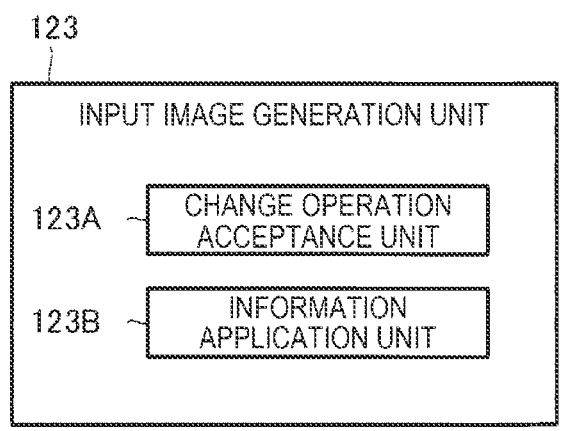
FIG. 2 is a block diagram showing the configuration of an input image generation unit according to the embodiment.
Figure 3:
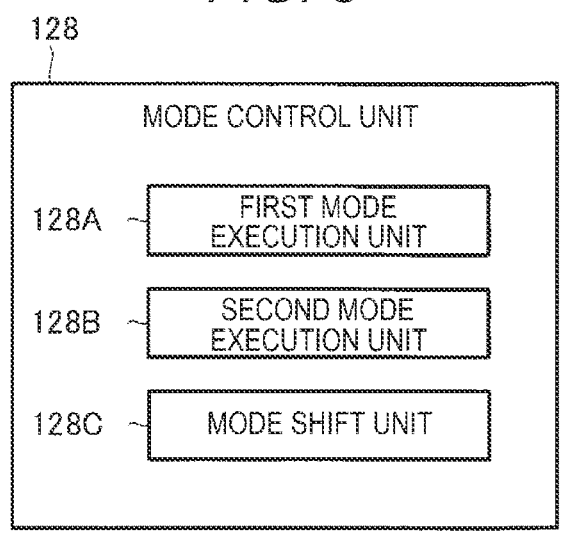
FIG. 3 is a block diagram showing the configuration of a mode control unit according to the embodiment.

FIG. 1 is a block diagram showing the configuration of a projector 1 according to a first embodiment. FIG. 2 is a functional block diagram showing the configuration of an input image generation unit 123 provided in the projector 1. FIG. 3 is a functional block diagram showing the configuration of a mode control unit 128 provided in the projector 1. The projector 1 has a projection device 11, a processing device 12, a storage device 13, and a communication device 14. The individual elements of the projector 1 are coupled to each other via a single bus or a plurality of buses for communicating information. Each element of the projector 1 is formed by a single device or a plurality of devices. A part of the elements of the projector 1 may be omitted.

The projection device 11 is a device projecting an image generated by a projection image generation unit 121, described later, onto a screen or a wall or the like. The projection device 11 projects various images under the control of the processing device 12. The projection device 11 includes, for example, a light source, a liquid crystal panel, and a projection lens, and modulates light from the light source, using the liquid crystal panel, and projects the modulated light onto a screen or a wall or the like via the projection lens. In this specification, the liquid crystal panel is equivalent to a "projection image generation device". The configuration where the projection device 11 has the liquid crystal panel is simply an example. Configurations according to this embodiment are not limited to this example. For example, this embodiment can also be applied to a DLP (digital light processing; trademark registered) device having a DMD (digital mirror device), instead of the liquid crystal panel.

The processing device 12 is a processor controlling the entirety of the projector 1 and is formed by, for example, a single chip or a plurality of chips. The processing device 12 is formed by, for example, a CPU (central processing unit) including an interface with a peripheral device, a computing device, and a register or the like. A part or all of the functions of the processing device 12 may be implemented by hardware such as a DSP (digital signal processor), an ASIC (application-specific integrated circuit), a PLD (programmable logic device), or an FPGA (field-programmable gate array). The processing device 12 executes various kinds of processing in parallel or in sequence.

The storage device 13 is a recording medium readable by the processing device 12 and stores a plurality of programs including a control program PR1 executed by the processing device 12. The storage device 13 may be formed by, for example, at least one of a ROM (read-only memory), an EPROM (erasable programmable ROM), an EEPROM (electrically erasable programmable ROM), a RAM (random-access memory), and the like. The storage device 13 may also be referred to as a register, a cache, a main memory, or a main storage device or the like.

The communication device 14 is a piece of hardware serving as a transmitting-receiving device for communicating with another device. Particularly in this embodiment, the communication device 14 is a communication device for connecting the projector 1 to another device wirelessly or via a wire. The communication device 14 is also referred to as, for example, a network device, a network controller, a network card, a communication module or the like.

The processing device 12 reads out and executes the control program PR1 from the storage device 13 and thus functions as a projection image generation unit 121, a transformation formula decision unit 122, an input image generation unit 123, a coordinate decision unit 124, a determination unit 125, an adjustment amount control unit 126, a notification unit 127, and a mode control unit 128. The control program PR1 may be transmitted from another device such as a server managing the projector 1, via a communication network, not illustrated.

The projection image generation unit 121 generates a projection image based on an input image acquired by the projection image generation unit 121 and causes the projection device 11 to project the projection image onto a wall or a screen or the like. The projection image generation unit 121 may acquire an input image from outside the projector 1 or may acquire an input image stored in the storage device 13. Also, in this embodiment, the projection image generation unit 121 acquires a coordinate value decided by the coordinate decision unit 124, described later, and generates a projection image 23, using the coordinate value.

Particularly, after acquiring a first input image 20, the projection image generation unit 121 corrects the shape of the first input image 20 on the liquid crystal panel included in the projection device 11 in such a way that a display image 24 displayed on a display surface such as a wall or a screen has the same shape as the first input image 20. In this specification, this correction is referred to as "geometric correction".

FIGS. 4A to 4E are explanatory views for the geometric correction by the projection image generation unit 121. An example shown in FIGS. 4A to 4C is for the case where the initial first input image 20 is not corrected on the liquid crystal panel. Consequently, the first input image 20 shown in FIG. 4A results in a projection image 21 in the same shape as a predetermined area 30 on the liquid crystal panel, as shown in FIG. 4B. It can be said that the projection image 21 is a projection image 21 that is not geometrically corrected. The "predetermined area" on the liquid crystal panel may be the entire area of the liquid crystal panel or may be a part of the area. In this case, a display image 22 displayed on the display surface has a shape that is different from the shape of the first input image 20, as shown in FIG. 4C. It can be said that the display image 22 is a display image 22 displayed by projecting the projection image 21 that is not geometrically corrected. In the example shown in FIGS. 4A to 4E, the shape of the first input image 20 is a rectangle. However, the shape of the display image 22 is not a rectangle. Consequently, the shape of the display image 22 is distorted. This distortion is caused by the positional relationship between the projector 1 and the display surface and the angle of projection of the projection image 21 from the projector 1 to the display surface. To cope with this, the projection image generation unit 121 corrects the shape of the first input image 20 on the liquid crystal panel, for example, into the shape of the projection image 23 shown in FIG. 4D. It can be said that the projection image 23 is a geometrically corrected projection image 23. As a result of projecting the projection image 23 on the display surface, the display image 24 displayed on the display surface is similar in shape to the first input image 20. It can be said that the display image 24 is a display image 24 displayed by projecting the geometrically corrected projection image 23.

In an example, the geometric correction by the projection image generation unit 121 is executed, based on an operation by the user to the projector 1. For example, the user of the projector 1 corrects the position of a vertex as a control point set on the first input image 20, using an input device, not illustrated, of the projector 1, while viewing the display image 22 actually displayed on the display surface. For example, when the first input image 20 is a quadrilateral, the user of the projector 1 may correct the four vertices of the quadrilateral of the first input image 20, one by one, as control points. In this case, the projection image generation unit 121 accepts position information representing the positions of the control points on the corrected projection image 21, based on the operation by the user.

FIGS. 5A to 5D are explanatory views for an example of the geometric correction. The geometric correction includes, for example, vertical-horizontal projection angle correction, vertex correction, curved surface projection correction, corner projection correction, and point correction.

The "vertical-horizontal projection angle correction" is geometric correction for correcting the angle of projection in the vertical direction of the projection image 23 and the angle of projection in the horizontal direction when the projection image 23 shown in FIG. 4D is projected onto the display surface.

Figure 5A:
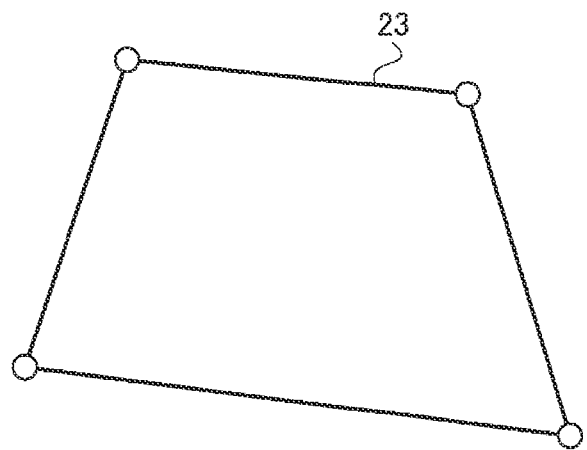
FIG. 5A is an explanatory view for an example of geometric correction according to the embodiment.

The "vertex correction" is geometric correction in which, for example, the user designates four vertices of the projection image 23 and individually corrects each of the vertices, as shown in FIGS. 4D and 5A.

Figure 5B:
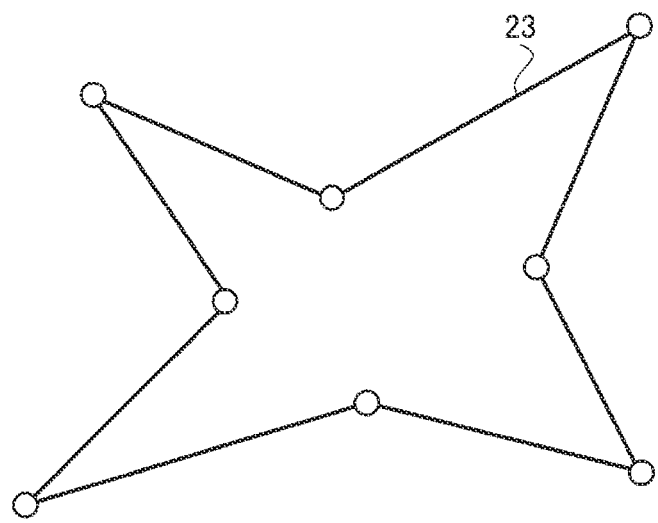
FIG. 5B is an explanatory view for an example of geometric correction according to the embodiment.

The "curved surface projection correction" is geometric correction executed when the projection image 23 is projected onto a curved surface, as shown in FIG. 5B. In the "curved surface projection correction", the user individually corrects each of eight points on the projection image 23 corresponding to the four vertices and the middle points on the individual sides of the display image 24, that is, eight points in total.

Figure 5C:
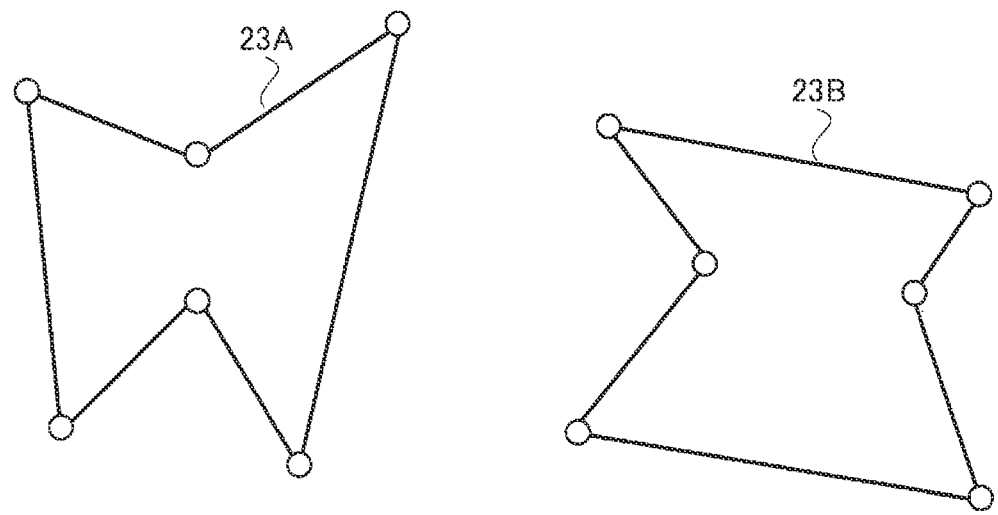
FIG. 5C is an explanatory view for an example of geometric correction according to the embodiment.

The "corner projection correction" is geometric correction used when the display surface is formed by two surfaces, for example, as in a corner of a room and the projection image 23 is divided into two projection images, that is, a projection image 23A and a projection image 23B, which are then projected onto the respective display surfaces. In the "corner projection correction", the user individually corrects each of the control points on the projection image 23A and the projection image 23B, as shown in FIG. 5C. When the projection image 23 is projected onto two wall parts next to each other in the horizontal direction, the projection image 23 is divided in the horizontal direction. Meanwhile, when the projection image 23 is projected onto a wall part and a ceiling part next to each other in the vertical direction, the projection image 23 is divided in the vertical direction.

Figure 5D:
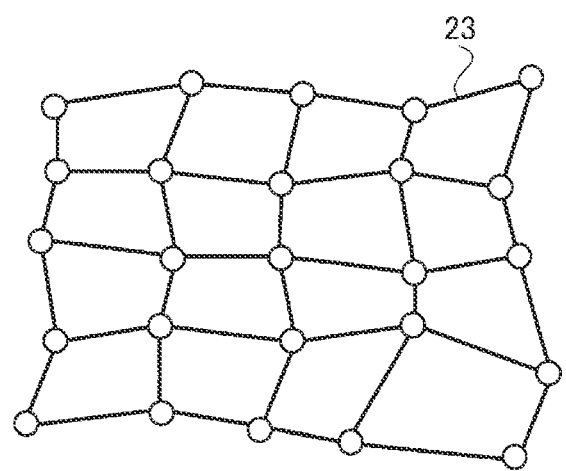
FIG. 5D is an explanatory view for an example of geometric correction according to the embodiment.

The "point correction" is geometric correction in which the projection image 23 is divided into a grid as shown in FIG. 5D and in which the user individually corrects each of the vertices and the division points on the projection image 23, as control points. In the "point correction", the vertices and the division points on the projection image 23 may be, for example, in one of the arrangement patterns of three rows in the vertical direction by three columns in the horizontal direction, five rows in the vertical direction by five columns in the horizontal direction, nine rows in the vertical direction by nine columns in the horizontal direction, 17 rows in the vertical direction by 17 columns in the horizontal direction, and 31 rows in the vertical direction by 31 columns in the horizontal direction.

Figure 6:
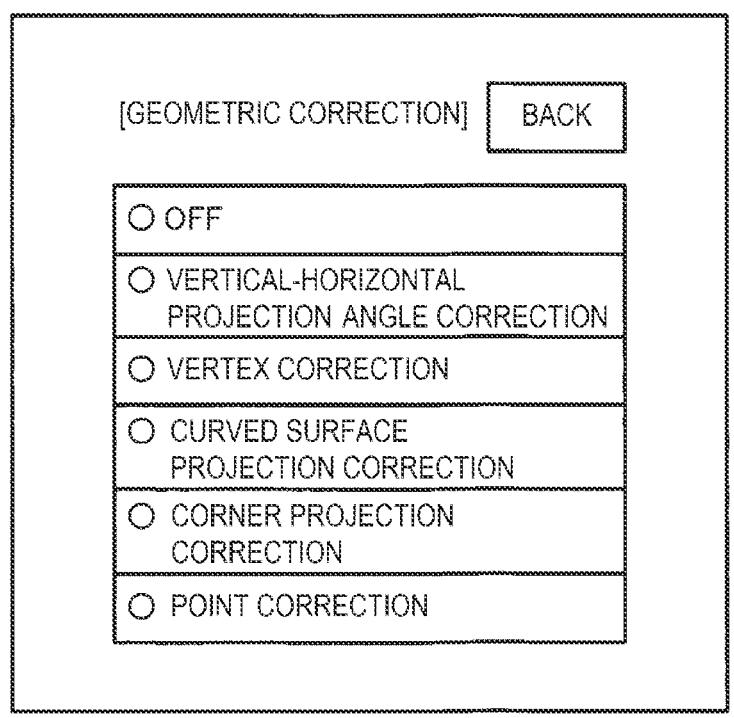
FIG. 6 shows an example of a menus screen used by a user when selecting a type of geometric correction in the embodiment.

FIG. 6 shows an example of a menu screen used by the user when selecting a type of geometric correction. In the example shown in FIG. 6, the user selects one of geometric correction OFF, vertical-horizontal projection angle correction, vertex correction, curved surface projection correction, corner projection correction, and point correction, using a direction key installed on a remote controller attached to the projector 1. After selecting a type of geometric correction, the user presses an Enter key installed on the remote controller and thus decides which geometric correction is actually used. When geometric correction OFF is selected, no geometric correction is performed.

Referring back to FIG. 1, the transformation formula decision unit 122 decides a projective transformation formula used in the geometric correction for deciding the shape of the projection image 23, based on the position information about the control point on the generated projection image 23 and the position information about the control point on the first input image 20 used for generating the projection image 23.

Referring to FIGS. 4A to 4E, the four control points on the first input image 20 shown in FIG. 4A are a vertex P, a vertex Q, a vertex R, and a vertex S. The four control points on the projection image 23 shown in FIG. 4D are a vertex p, a vertex q, a vertex r, and a vertex s. The vertex P, the vertex Q, the vertex R, and the vertex S correspond one-to-one to the vertex p, the vertex q, the vertex r, and the vertex s. The first input image 20 is in the same size as the predetermined area 30 on the liquid crystal panel. The coordinates of the vertex P in an XY coordinate system set for the predetermined area 30 on the liquid crystal panel are (Xp, Yp) and the coordinates of the vertex p are (xp, yp). The parameters used in projective transformation are expressed by $\alpha$, $\beta$, $\gamma$, $\delta$, $\epsilon$, $\zeta$, $\eta$, and $\theta$. In this case, the transformation formula decision unit 122 sets the following equations (1) and (2):

$$xp = ((\alpha^* Xp + \beta^* Yp + \gamma)/(\eta^* Xp + \theta^* Yp + 1) \quad (1)$$

$$yp = (\delta^* Xp + \epsilon^* Yp + \zeta)/(\eta^* Xp + \theta^* Yp + 1) \quad (2).$$

The transformation formula decision unit 122 also sets equations similar to the equations (1) and (2) for a combination of the vertex Q and the vertex q, a combination of the vertex R and the vertex r, and a combination of the vertex S and the vertex s, and thus sets eight equations in total. The transformation formula decision unit 122 finds the values of the parameters $\alpha$, $\beta$, $\gamma$, $\delta$, $\epsilon$, $\zeta$, $\eta$, and $\theta$ from the eight equations and decides the following equations (3) and (4) as projective transformation formulae:

$$x = (\alpha^* X + \beta^* Y + \gamma)/(\eta^* X + \theta^* Y + 1) \quad (3)$$

$$y = (\delta^* X + \epsilon^* Y + \zeta)/(\eta^* X + \theta^* Y + 1) \quad (4).$$

Referring back to FIG. 1, the input image generation unit 123 generates a second input image 50, 70 or 80 as a result of applying at least one of a change in size and a movement to the first input image 20.

As shown in FIG. 2, the input image generation unit 123 has a change operation acceptance unit 123A and an information application unit 123B.

The change operation acceptance unit 123A accepts a change operation by the user for a change in the size of the first input image 20 and a movement of the first input image 20. More specifically, after the foregoing geometric correction is executed, the change operation acceptance unit 123A accepts a change operation for the size of the display image 24 or the position of the display image 24 on the display surface, with its similarity in shape to the first input image 20 maintained. Then, the change operation acceptance unit 123A acquires change information representing at least one of size information about the change in the size of the first input image 20 and movement information about the movement of the first input image 20, based on the accepted change operation. The "change operation" in this case refers to an input of the change information by the user from the input device, not illustrated, of the projector 1, for example, the remote controller attached to the projector 1.

The information application unit 123B applies the change information acquired by the change operation acceptance unit 123A to the first input image 20 and thus generates the second input image 50, 70 or 80.

Referring back to FIG. 1, the coordinate decision unit 124 executes projective transformation of the positions of all the pixels in the second input image 50, 70 or 80 in a coordinate system prescribing the position of the projection image, for example, in the XY coordinate system on the predetermined area 30 on the liquid crystal panel, using the projective transformation formulae decided by the transformation formula decision unit 122. The positions of all the pixels include the four vertices as control points on the second input image 50, 70 or 80. Thus, the coordinate decision unit 124 decides coordinates prescribing the positions of the four vertices of a projection image 51, 71 or 81 corresponding respectively to the four vertices of the second input image 50, 70 or 80.

Referring to FIGS. 7A to 10F, a method for deciding the positions of the four vertices of the projection image 51 or 71 according to the embodiment and a method for deciding the positions of the four vertices of a projection image 40 or 60 as a comparative example will now be described. FIGS. 7A to 7E are explanatory views for the case where the display image is enlarged or reduced using the image processing method according to the comparative example. FIGS. 8A to 8F are explanatory views for the case where the display image is enlarged or reduced using the image processing method according to the embodiment. FIGS. 9A to 9E are explanatory views for the case where the display image is moved using the image processing method according to the comparative example. FIGS. 10A to 10F are explanatory views for the case where the display image is moved using the image processing method according to the embodiment.

Figure 7A:
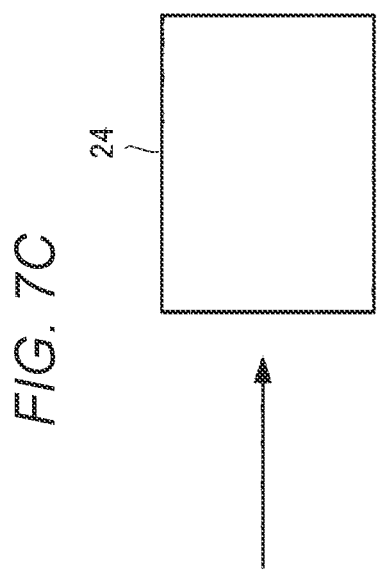
FIGS. 7A to 7E are explanatory views for the case where a display image is enlarged or reduced using an image processing method according to a comparative example.
Figure 7B:
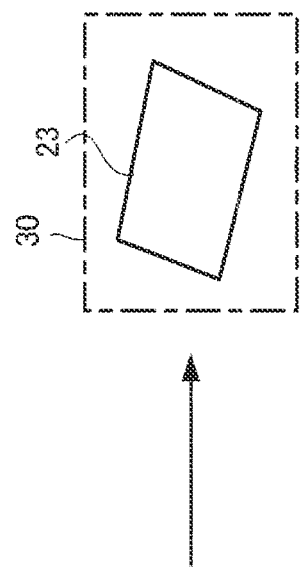
Figure 7C:
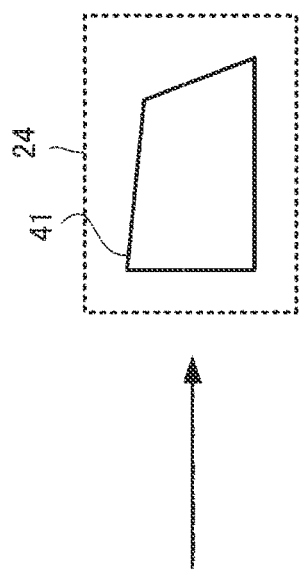
Figure 7D:
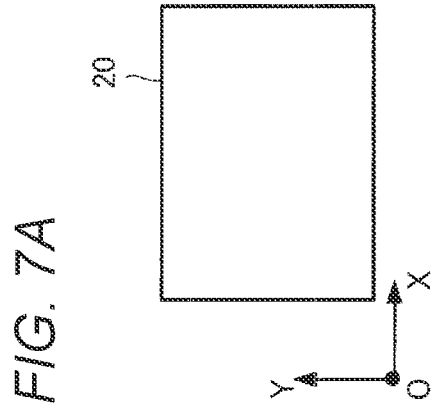

Referring to FIGS. 7A to 7E, the projector according to the comparative example geometrically corrects the first input image 20 shown in FIG. 7A, as described above, and thus generates the projection image 23 shown in FIG. 7B. The display image 24 displayed by projecting the projection image 23 onto the projection surface is similar in shape to the first input image 20, as shown in FIG. 7C. When enlarging or reducing the display image 24, the projector according to the comparative example uses the digital zoom function and thus enlarges or reduces the projection image 23 shown in FIG. 7B on the liquid crystal panel. Thus, the projection image 40 shown in FIG. 7D is generated. It can be said that the projection image 40 is a projection image 40 enlarged or reduced by the digital zoom function. The "digital zoom" in this case refers to the function of enlarging or reducing the digital image itself on the predetermined area 30 on the liquid crystal panel without moving the projection lens itself provided in the projector.

Figure 7E:
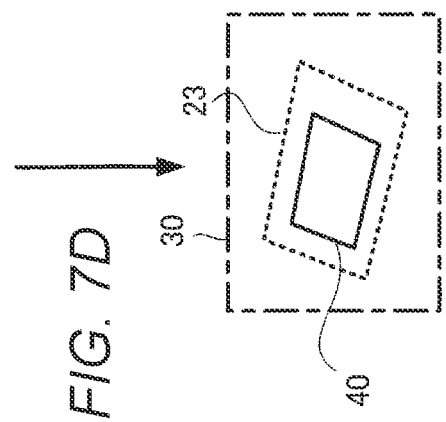

The projection image 40 is similar in shape to the projection image 23 on the predetermined area 30 on the liquid crystal panel. When the projector according to the comparative example projects the projection image 40 onto the display surface, the shape of a display image 41 that is displayed differs from the shape of the display image 24, as shown in FIG. 7E, due to the positional relationship between the projector and the display surface and the angle of projection of the projection image 40 from the projector onto the display surface. It can be said that the display image 41 is a display image 41 displayed by projecting the projection image 40 enlarged or reduced by the digital zoom function.

Meanwhile, referring to FIGS. 8A to 8F, the input image generation unit 123 of the projector 1 according to the embodiment applies the change information representing the size information about the change in the size, to the first input image 20 shown in FIG. 8A, and thus generates the second input image 50 shown in FIG. 8D. It can be said that the second input image 50 is a second input image 50 generated by changing the size of the first input image 20.

The coordinate decision unit 124 executes projection transformation of the positions of all the pixels in the second input image 50, using the projective transformation formulae decided by the transformation formula decision unit 122. The positions of all the pixels include the four vertices as control points on the second input image 50. Thus, the coordinate decision unit 124 decides coordinates prescribing the positions of the four vertices of the projection image 51. The projection image generation unit 121 generates the projection image 51 as shown in FIG. 8E, based on the second input image 50 and the coordinate position that is projectively transformed by the coordinate decision unit 124. It can be said that the projection image 51 is a projection image 51 formed by executing projective transformation of the second input image 50 that is changed in size.

The projection image 51 is not similar in shape to the projection image 23 on the predetermined area 30 on the liquid crystal panel. However, when the projector 1 according to the embodiment projects the projection image 51 onto the display surface, the shape of a display image 52 that is displayed is similar to the shape of the display image 24, as shown in FIG. 8F. It can be said that the display image 52 is a display image 52 displayed by projecting the projection image 51 that is projectively transformed.

Referring to FIGS. 9A to 9E, the projector according to the comparative example geometrically corrects the first input image 20 shown in FIG. 9A, as described above, and thus generates the projection image 23 shown in FIG. 9B. The display image 24 displayed by projecting the projection image 23 onto the projection surface is similar in shape to the first input image 20, as shown in FIG. 9C. When moving the display image 24, the projector according to the comparative example uses the digital shift function and thus moves the projection image 23 shown in FIG. 9B on the liquid crystal panel. Thus, the projection image 60 is generated. It can be said that the projection image 60 is a projection image 60 moved by the digital shift function. The "digital shift" in this case refers to the function of moving the digital image itself on the predetermined area 30 on the liquid crystal panel without moving the projection lens itself provided in the projector.

The projection image 60 is similar in shape to the projection image 23 on the predetermined area 30 on the liquid crystal panel. However, when the projector according to the comparative example projects the projection image 60 onto the display surface, the shape of a display image 61 that is displayed differs from the shape of the display image 24, as shown in FIG. 9E, due to the positional relationship between the projector and the display surface and the angle of projection of the projection image 60 from the projector onto the display surface. It can be said that the display image 61 is a display image 61 displayed by projecting the projection image 60 moved by the digital shift function.

Meanwhile, referring to FIGS. 10A to 10F, the input image generation unit 123 of the projector 1 according to the embodiment applies the change information representing the movement information about the movement of the first input image 20, to the first input image 20 shown in FIG. 10A, and thus generates the second input image 70 shown in FIG. 10D. It can be said that the second input image 70 is a second input image 70 generated by moving the first input image 20. Also, the coordinate decision unit 124 executes projection transformation of the positions of all the pixels in the second input image 70, using the projective transformation formulae decided by the transformation formula decision unit 122. The positions of all the pixels include the four vertices as control points on the second input image 70. The projection image generation unit 121 generates the projection image 71 as shown in FIG. 10E, based on the second input image 70 and the coordinate position that is projectively transformed by the coordinate decision unit 124. It can be said that the projection image 71 is a projection image 71 formed by executing projective transformation of the second input image 70 to which the change information representing the movement information is applied.

The projection image 71 is not similar in shape to the projection image 23 on the predetermined area 30 on the liquid crystal panel. However, when the projector 1 according to the embodiment projects the projection image 71 onto the display surface, the shape of a display image 72 that is displayed is similar to the shape of the display image 24, as shown in FIG. 10F. It can be said that the display image 72 is a display image 72 displayed by projecting the projection image 71 that is projectively transformed.

FIGS. 11A to 11E show an example of projection images 100 to 104 in the image processing methods according to the embodiment and the comparative example. More specifically, FIGS. 11A to 11E show a change to the projection images 100 to 104 on the predetermined area 30 on the liquid crystal panel when the display image is reduced and subsequently moved, using the image processing methods described with reference to FIGS. 7A to 10F.

Figure 11A:
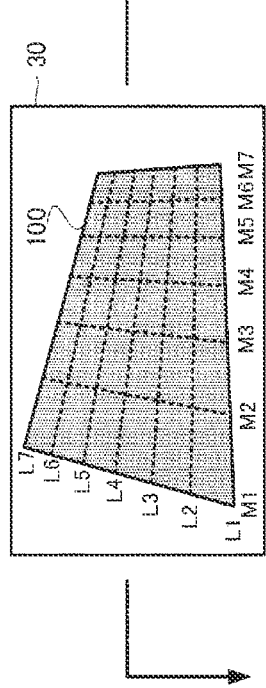
FIGS. 11A to 11E show an example of projection images by the image processing methods according to the embodiment and the comparative example.

FIG. 11A shows the projection image 100 before the reduction and the movement. The projection image 100 is a quadrilateral formed by substantially horizonal straight lines L1 and L7 and substantially vertical straight lines M1 and M7, as the four sides. The projection image 100 is already processed by proper geometric correction. Therefore, when the projection device 11 projects the projection image 100 onto the display surface, the two sides corresponding to the straight lines L1 and L7 are straight lines parallel to the substantially horizontal sides of the display surface. Also, the two sides corresponding to the straight lines M1 and M7 are straight lines parallel to the substantially vertical sides of the display surface. That is, when the display surface is a rectangle, the display image displayed by projecting the projection image 100 onto the display surface is substantially a rectangle.

The space between the straight lines L1 and L7 in the projection image 100 is divided by straight lines L2 to L6.

More specifically, when the projection image 100 is projected on the foregoing display surface, the space between the side corresponding to the straight line L1 and the side corresponding to the straight line L7, in the display surface, is divided at equal intervals by straight lines corresponding to the straight lines L2 to L6.

Also, the space between the straight lines M1 and M7 in the projection image 100 is divided by straight lines M2 to M6. More specifically, when the projection image 100 is projected on the foregoing display surface, the space between the side corresponding to the straight line M1 and the side corresponding to the straight line M7, in the display surface, is divided at equal intervals by straight lines corresponding to the straight lines M2 to M6.

Figure 11D:
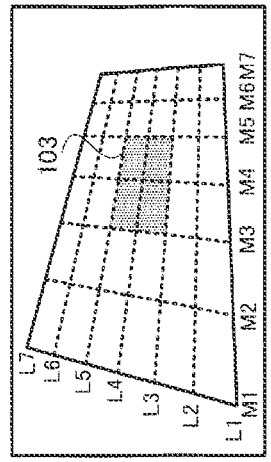

The case where an attempt to reduce the display image corresponding to the projection image 100 to one-third the original size both in the vertical direction and in the horizontal direction is made by the image processing method according to the comparative example, will now be described. In this case, the projection image 100 is reduced to the projection image 101 that remains similar in shape to the projection image 100 but is one-third the length of the projection image 100 both in the vertical direction and in the horizontal direction, as shown in FIG. 11B. It can be said that the projection image 101 is a projection image 101 reduced by the digital zoom function. It is now assumed that the predetermined area 30 on the liquid crystal panel is a rectangle formed by horizontal straight lines N1 and N4 and vertical straight lines O1 and O4, as the four sides. It is also assumed that the predetermined area 30 on the liquid crystal panel is equally trisected in the vertical direction by straight lines N2 and N3 and is equally trisected in the horizontal direction by straight lines O2 and O3. In this case, the projection image 101 fits inside an area formed by the straight lines N2, N3, O2, and O3, as the four sides.

Figure 11E:
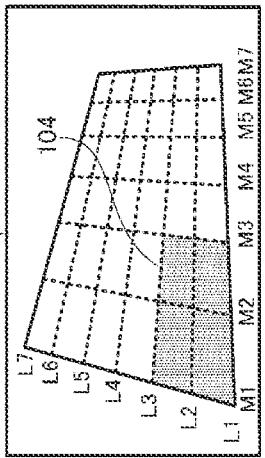
Figure 11B:
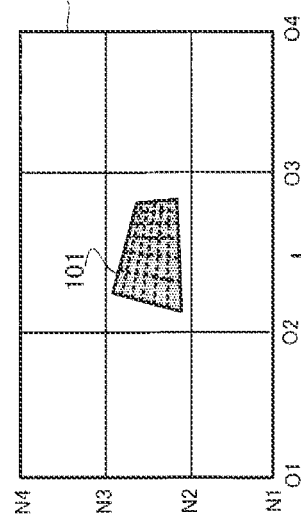
Figure 11C:
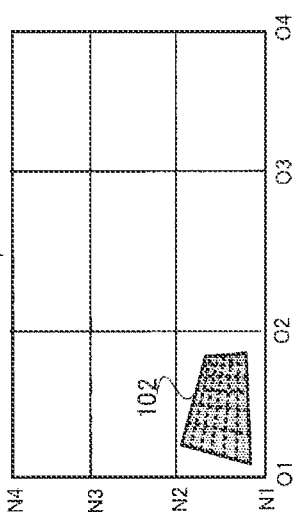
Figure 12A:
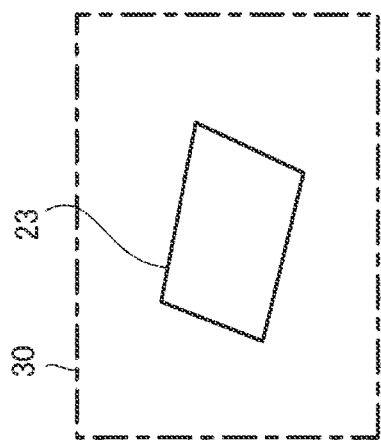
FIGS. 12A to 12D show an example of a specific content of determination by a determination unit according to the embodiment.
Figure 12B:
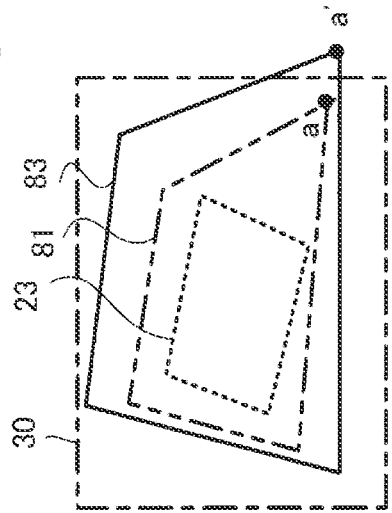
Figure 12C:
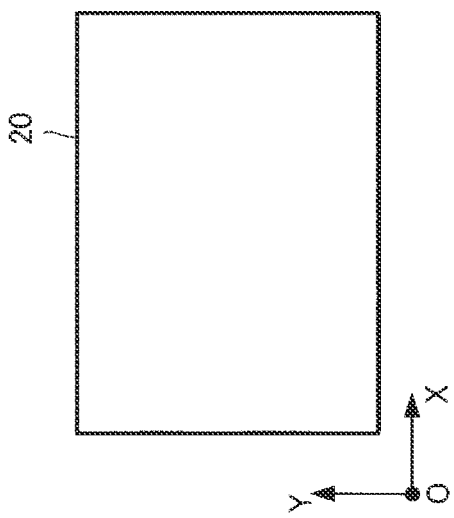
Figure 12D:
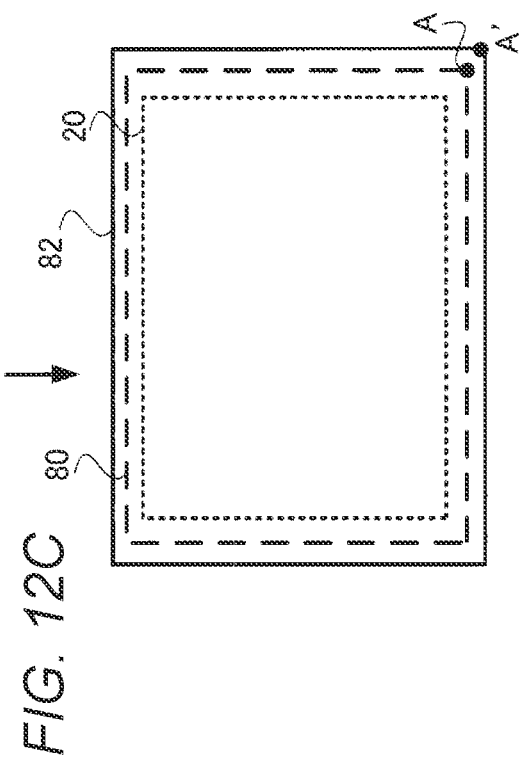

When the display image corresponding to the projection image 101 is subsequently moved to the bottom left in the display surface, the projection image 102 fits inside an area formed by the straight lines N1, N2, O1, and O2 as the four sides, as shown in FIG. 11C. It can be said that the projection image 102 is a projection image 102 moved by the digital shift function.

The projection image 102 remains similar in shape to the projection image 100. However, when the projector according to the comparative example projects the projection image 102 onto the display surface, the display image that is displayed is not similar in shape to the original display image, due to the positional relationship between the projector and the display surface and the angle of projection of the projection image 102 from the projector onto the display surface. Therefore, when the image processing method according to the comparative example is used, the projection image 102 needs to be geometrically corrected again.

The case where the display image corresponding to the projection image 100 is reduced to one-third the original size both in the vertical direction and in the horizontal direction, using the image processing method according to the embodiment, will now be described. In this case, the projection image 100 turns into the quadrilateral projection image 103 formed by the straight lines L3, L5, M3, and M5 as the four sides, as shown in FIG. 11D. It can be said that the projection image 103 is a projection image 103 that is projectively transformed.

When the display image corresponding to the projection image 103 is subsequently moved to the bottom left in the display surface, the projection image 103 turns into the quadrilateral projection image 104 formed by the straight lines L1, L3, M1, and M3 as the four sides, as shown in FIG. 11E. It can be said that the projection image 104 is a projection image 104 that is projectively transformed.

The projection image 104 does not remain similar in shape to the projection image 100. However, when the projector 1 according to the embodiment projects the projection image 104 onto the display surface, the display image that is displayed is similar in shape to the original display image.

Referring back to FIG. 1, the determination unit 125 determines whether the position of at least one point, of the four vertices of the projection image 81 generated by executing projective transformation of the second input image 80, is located outside the predetermined area 30 on the liquid crystal panel or not.

The determination unit 125 may determine whether the positions of two points that are next to each other, of the four vertices of the projection image 81 generated by executing projective transformation of the second input image 80, are located outside the predetermined area 30 on the liquid crystal panel or not.

FIGS. 12A to 12D show an example of the specific content of determination by the determination unit 125. It is now assumed that the input image generation unit 123 accepts information to enlarge the first input image 20 as the size information about a change in the size of the first input image 20 shown in FIG. 12A and generates the second input image 80 shown in FIG. 12C. It can be said that the second input image 80 is a second input image 80 formed by enlarging the first input image 20. Subsequently, it is assumed that the coordinate decision unit 124 decides the coordinates of all the pixels, based on the second input image 80. All the pixels include the four vertices as control points on the second input image 80. Finally, it is assumed that the projection image generation unit 121 generates the projection image 81 shown in FIG. 12D, based on the second input image 80 and the coordinate position that is projectively transformed by the coordinate decision unit 124. It can be said that the projection image 81 is a projection image 81 formed by executing projective transformation of the enlarged second input image 80. At this point, it is assumed that a vertex a of the projection image 81 corresponding to one vertex A of the four vertices of the second input image 80 is located inside the predetermined area 30 on the liquid crystal panel. In this case, the determination unit 125 determines that the vertex a is included in the predetermined area 30.

It is now assumed that the input image generation unit 123 subsequently accepts information to enlarge the first input image 20 again and generates a second input image 82. It can be said that the second input image 82 is a second input image 82 formed by enlarging the first input image 20. It is assumed that the coordinate decision unit 124 decides the coordinates of all the pixels, based on the second input image 82. All the pixels include the four vertices as control points on the second input image 82. Finally, it is assumed that the projection image generation unit 121 generates a projection image 83 shown in FIG. 12D, based on the second input image 82 and the coordinate position that is projectively transformed by the coordinate decision unit 124. It can be said that the projection image 83 is a projection image 83 formed by executing projective transformation of the enlarged second input image 82. At this point, it is assumed that a vertex a' of the projection image 83 corresponding to the one vertex A of the four vertices of the second input image 80 is located outside the predetermined area 30 on the liquid crystal panel. In this case, the determination unit 125 determines that the vertex a' is not included in the predetermined area 30.

The adjustment amount control unit 126 accepts the foregoing change operation, based on an operation by the user to an operating element, for example, a particular function button installed on the remote controller attached to the projector 1. In this case, the adjustment amount control unit 126 controls the unit amount of adjustment according to the time length of the operation to the operating element. The unit amount of adjustment is the amount of adjustment of the size of the display image or the position of the display image on the display surface per unit time.

In the process of adjusting the size of the display image or the position of the display image on the display surface, when the projection image 83 is expected to extend beyond the boundary of the predetermined area 30 on the liquid crystal panel, the adjustment amount control unit 126 sets the unit amount of adjustment to a minimum amount. Subsequently, the input image generation unit 123 generates the second input image 82 anew in order to adjust the size of the display image or the position of the display image on the display surface, based on the foregoing time length and the new unit amount of adjustment. The coordinate decision unit 124 executes projective transformation of the positions of all the pixels in the second input image 82 that is generated anew, using the projective transformation formulae decided by the transformation formula decision unit 122. The projection image generation unit 121 generates the projection image 83 anew, based on the second input image 82 that is generated anew and the coordinate position that is projectively transformed by the coordinate decision unit 124. Although it is preferable to minimize the unit amount of adjustment, the unit amount of adjustment may be reduced to a unit amount of adjustment that is smaller than at the point when it is determined that the projection image extends beyond the boundary. In this case, the unit amount of adjustment may be sequentially changed to a smaller value every time it is determined that the projection image extends beyond the boundary.

Figure 13A:
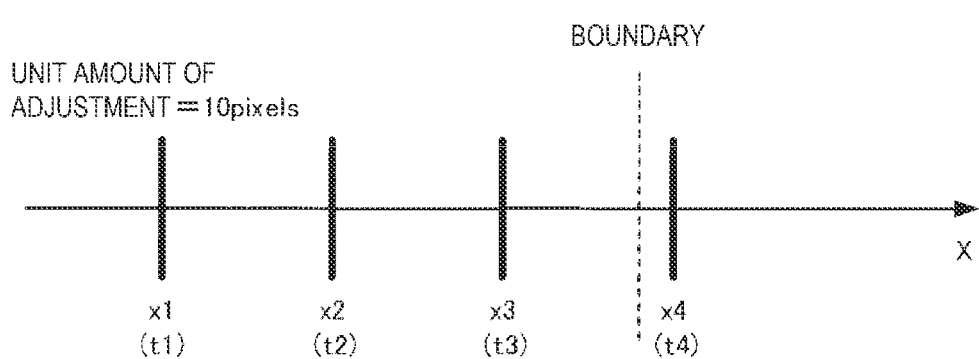
FIGS. 13A to 13C are explanatory views of operations by an adjustment amount control unit and a coordinate decision unit according to the embodiment.
Figure 13B:
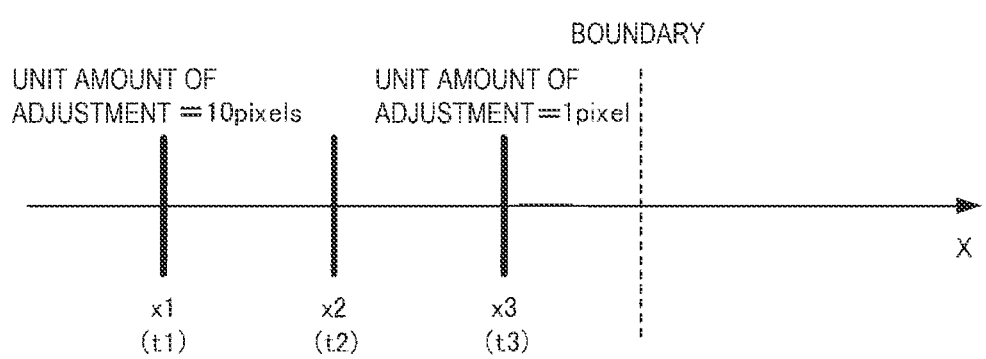
Figure 13C:
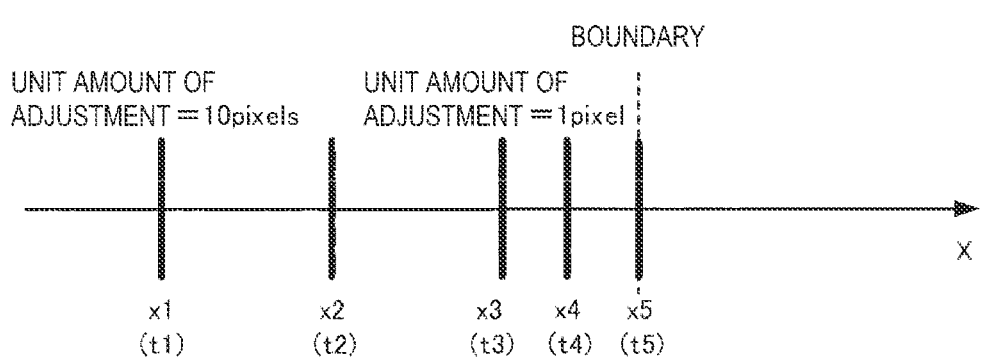

FIGS. 13A to 13C are explanatory views of an operation by the adjustment amount control unit 126. The operation by the adjustment amount control unit 126 will now be described, referring to FIGS. 13A to 13C. To simplify the description, the adjustment of the position of the display image on the display surface is described as an example. The adjustment amount control unit 126 executes a similar operation for the adjustment of the size of the display image.

The adjustment amount control unit 126 changes the unit amount of adjustment in an accelerating manner according to the time period for which the operating element continues to be operated, for example, the time period for which a particular function button installed on the remote controller attached to the projector 1 continues to be pressed. For example, for a predetermined time period from the start of the pressing, the adjustment amount control unit 126 sets the unit amount of adjustment to one pixel. Thus, the display image moves by one pixel each. After the lapse of the predetermined time period from the start of the pressing, the adjustment amount control unit 126 increases the unit amount of adjustment to two pixels, three pixels, four pixels, and so on. With this increase, the speed at which the display image moves gradually increases.

In an example, it is assumed that the display image moves in the state where the unit amount of adjustment is 10 pixels and that time is expressed by t. It is now assumed that one vertex of the display image moves along the X-axis, that the position of the vertex at a time point t1 is X=x1, that the position of the vertex at a time point t2 is X=x2, and that the position of the vertex at a time point t3 is X=x3, as shown in FIG. 13A. It is also assumed that the position of the vertex at a time point t4 is expected to go beyond a boundary on the display surface corresponding to the boundary of the predetermined area 30 on the liquid crystal panel.

In this case, the determination unit 125 outputs, to the adjustment amount control unit 126, a result of determination to the effect that the position of the vertex at the time point t4 goes beyond the boundary on the display surface corresponding to the boundary of the predetermined area 30 on the liquid crystal panel.

As shown in FIG. 13B, the adjustment amount control unit 126 sets the unit amount of adjustment from the time point t3 onward to one pixel, which is the minimum unit amount of adjustment.

Subsequently, in the state where the unit amount of adjustment is one pixel, the display image moves, based on the time period for which the function button continues to be pressed. Thus, the user of the projector 1 can move the display image to the vicinity of the boundary on the display surface, that is, to the limit of the available correction range, as shown in FIG. 13C, without stopping pressing the function button.

Referring back to FIG. 1, when the determination unit 125 determines that the position of at least one point is located outside the predetermined area 30 on the liquid crystal panel in the state where the unit amount of adjustment is the minimum value, the notification unit 127 notifies the outside of the projector 1 of the result of determination. As a method for the notification of the result of determination, the projector 1 may display the result of determination on a display device, not illustrated. Alternatively, the projector 1 may output a signal representing the result of determination to the outside of the projector 1.

Also, when the determination unit 125 determines that the positions of at least two points that are next to each other are not included in the predetermined area 30 on the liquid crystal panel, the notification unit 127 may notify the outside of the projector 1 of the result of determination.

The mode control unit 128 controls the operation mode of the projector 1. More specifically, the mode control unit 128 executes a "first mode" in which the geometric correction is executed, using mainly the projection image generation unit 121. The mode control unit 128 also executes a "second mode" in which the size and position of the display image are controlled, using mainly the input image generation unit 123 and the coordinate decision unit 124. The mode control unit 128 executes each mode while shifting between the first mode and the second mode.

As shown in FIG. 3, the mode control unit 128 has a first mode execution unit 128A, a second mode execution unit 128B, and a mode shift unit 128C.

The first mode execution unit 128A executes the geometric correction by using mainly the projection image generation unit 121. Thus, the first mode execution unit 128A modifies the shape of the first input image 20 and thus generates the projection image 23. In this case, the first mode execution unit 128A individually controls the control points included in the first input image 20.

The second mode execution unit 128B applies the change information to the first input image 20 and thus generates the second input image 50 or 70, by using mainly the input image generation unit 123. Subsequently, the second mode execution unit 128B executes projective transformation and thus generates the projection image 51 or 71, by using mainly the coordinate decision unit 124. In this case, the second mode execution unit 128B collectively controls the control points included in the first input image 20 and the second input image 50 or 70.

The mode shift unit 128C shifts to the execution of the second mode when a change operation is accepted during the execution of the first mode. Meanwhile, the mode shift unit 128C shifts to the execution of the first mode when there is no change operation for a predetermined time period during the execution of the second mode or when an operation to return to the first mode is accepted.

Figure 14:
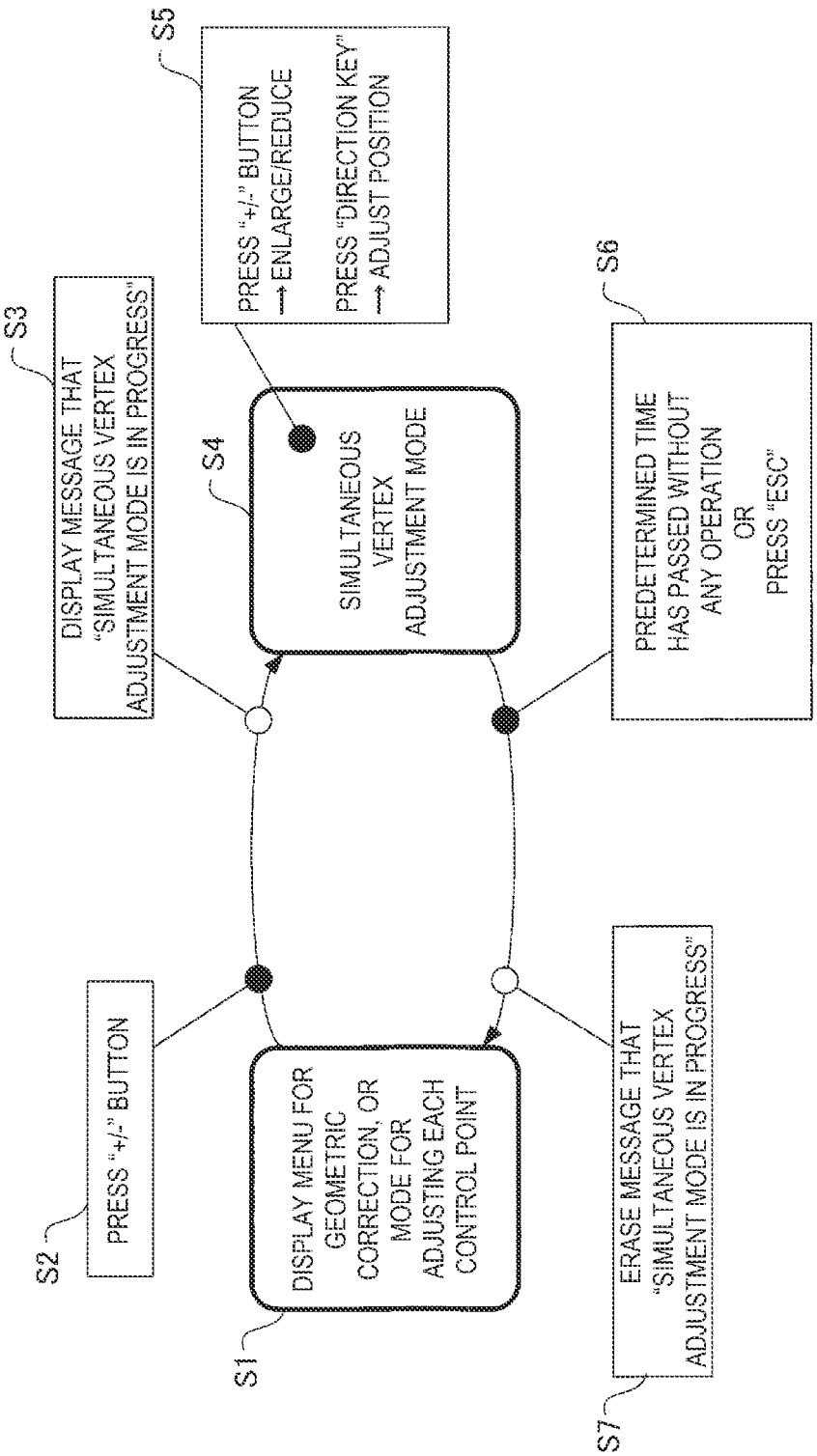
FIG. 14 shows a state transition diagram in connection with the way of mode shift performed by a mode control unit according to the embodiment.

FIG. 14 shows a state transition diagram in connection with the way of the mode shift performed by the mode control unit 128. In S1, it is assumed that the menu screen for geometric correction shown in FIG. 6 is displayed in the form of an OSD or that the first mode execution unit 128A is executing the first mode, that is, the mode in which each control point is adjusted. In this specification, the menu screen for geometric correction is equivalent to a "first image".

It is now assumed that the user of the projector 1 presses, for example, a "+" button or a "−" button as a particular function button, as shown in S2. These buttons are collectively referred to as a "+/−" button in FIG. 14. Then, the mode shift unit 128C displays a message that "simultaneous vertex adjustment mode is in progress" in the form of an OSD, as shown in S3. In this specification, the message that "simultaneous vertex adjustment mode is in progress" is equivalent to a "second image".

Figure 15A:
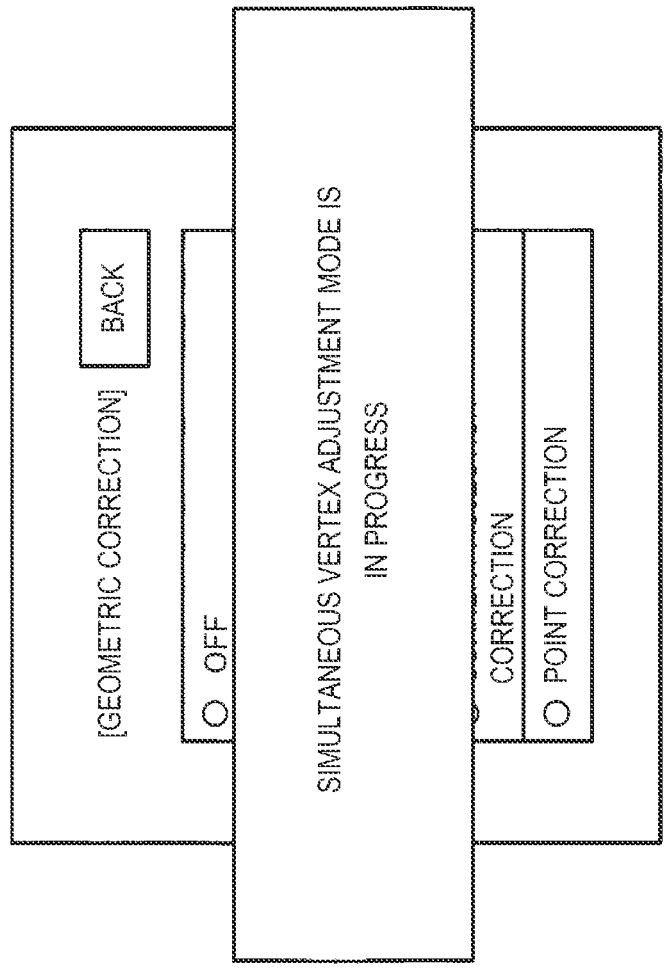
FIG. 15A is an explanatory view for a display example of a message according to the embodiment.
Figure 15B:
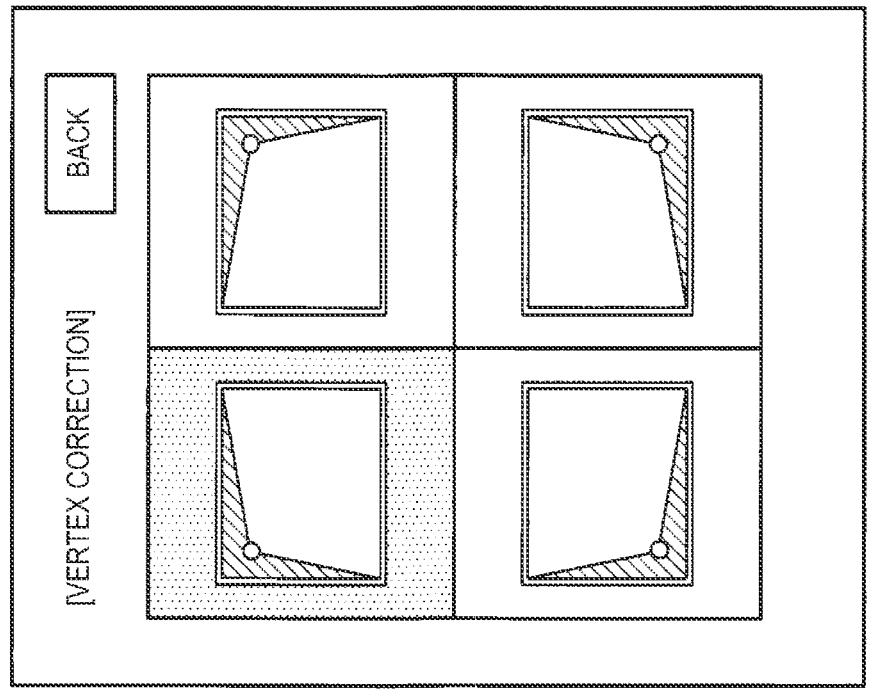
FIG. 15B is an explanatory view for a display example of a message according to the embodiment.

FIGS. 15A and 15B are explanatory views for a display example of the message. As shown in FIG. 15A, the mode shift unit 128C may display the message as superimposed on the menu screen for geometric correction or the screen for adjusting each control point. Alternatively, as shown in FIG. 15B, the mode shift unit 128C may display the message side by side with the menu screen for geometric correction or the screen for adjusting each control point.

Subsequently, in S4, the second mode execution unit 128B executes the second mode, that is, the mode in which all the vertices of the projection image 51 or 71 or the display image 52 or 72 displayed by projecting the projection image 51 or 71 onto the display surface are collectively adjusted as control points.

In this case, as shown in S5, when the user of the projector 1 continues to press, for example, the "+" button or the "−" button as a particular function button, the display image is enlarged or reduced. Meanwhile, when the user of the projector 1 presses, for example, a direction button as a particular function button, the position of the display image 52 or 72 is adjusted.

When a predetermined time has passed without any operation as shown in S6 during the execution of the second mode by the second mode execution unit 128B, the mode shift unit 128C erases the message that "simultaneous vertex adjustment mode is in progress". Alternatively, when the user of the projector 1 presses, for example, an "ESC" button as a particular function button, that is, when an operation to return to the first mode is accepted, the mode shift unit 128C erases the message that "simultaneous vertex adjustment mode is in progress", as shown in S7. Then, the operation of the mode control unit 128 returns to S1. That is, the first mode execution unit 128A executes the first mode.

The mode shift shown in FIG. 14 enables the user of the projector 1 to seamlessly execute the second mode when controlling each control point in the first mode. The mode shift also enables the user of the projector 1 to return to the first mode and precisely adjust each control point again after adjusting the vertices collectively and simultaneously in the second mode.

2. Operation According to Embodiment

Figure 16:
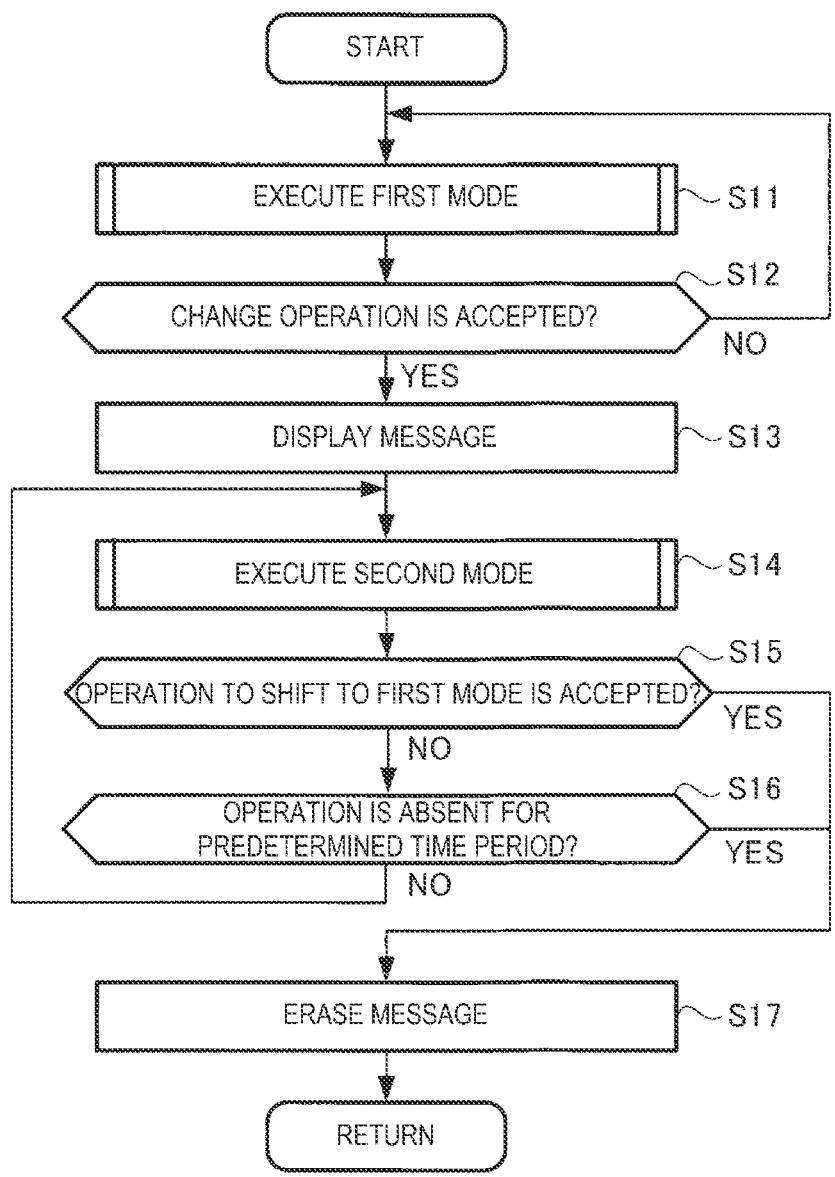
FIG. 16 is a flowchart showing an example of operation by the projector according to the embodiment.
Figure 17:
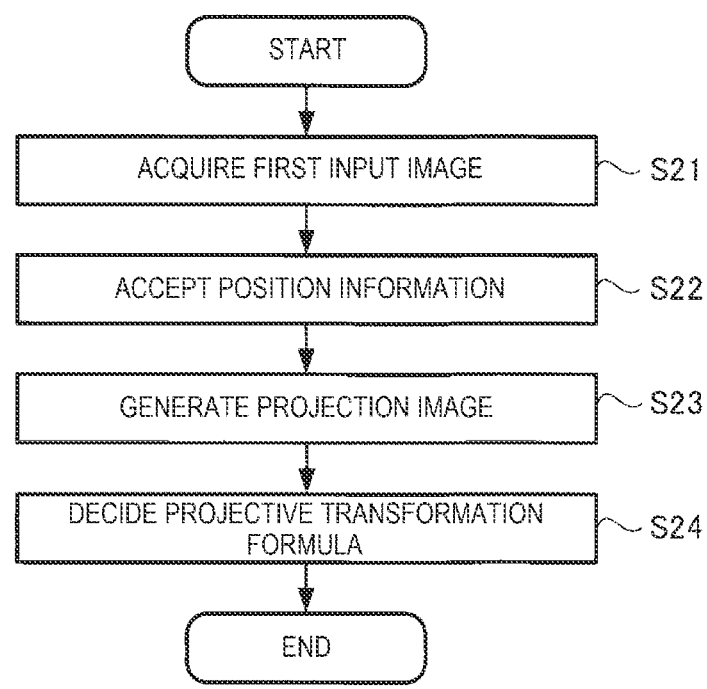
FIG. 17 is a flowchart showing an example of operation by the projector according to the embodiment.
Figure 18:
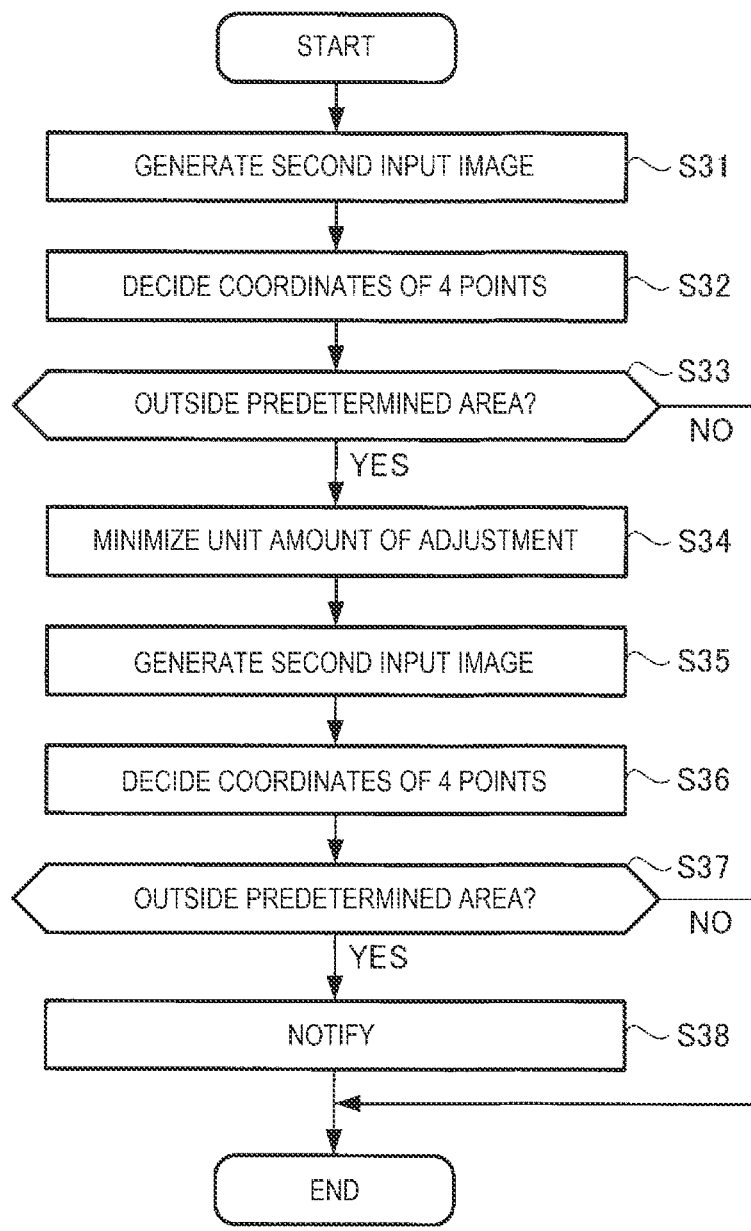
FIG. 18 is a flowchart showing an example of operation by the projector according to the embodiment.

FIGS. 16 to 18 are flowcharts showing an example of operation by the projector 1 according to the first embodiment. An example of operation by the projector 1 will now be described, referring to FIGS. 16 to 18.

In step S11, the processing device 12 functions as the first mode execution unit 128A and thus executes the first mode. Details of the execution content will be described later with reference to FIG. 17.

In step S12, the processing device 12 determines whether a change operation is accepted or not. Specifically, when a change operation by the user for at least one of a change in the size of the first input image 20 and a movement of the first input image 20 is accepted, the processing device 12 gives YES in step S12, that is, determines that the change operation is accepted. In this case, the processing device 12 advances the processing to step S13. Meanwhile, when the change operation is not accepted, the processing device 12 gives NO in step S12, that is determines that the change operation is not accepted. In this case, the processing device 12 advances the processing to step S11.

In step S13, the processing device 12 functions as the mode shift unit 128C and thus displays the message that "simultaneous vertex adjustment mode is in progress" shown in FIGS. 15A and 15B, in the form of an OSD.

In step S14, the processing device 12 functions as the second mode execution unit 128B and thus executes the second mode. Details of the execution content will be described later with reference to FIG. 18.

In step S15, the processing device 12 determines whether an operation by the user to shift to the first mode is accepted or not. Specifically, when the operation by the user to shift to the first mode is accepted, the processing device 12 gives YES in step S15, that is, determines that the operation by the user to shift to the first mode is accepted. In this case, the processing device 12 advances the processing to step S17. Meanwhile, when the above operation is not accepted, the processing device 12 gives NO in step S15, that is, determines that the operation by the user to shift to the first mode is not accepted. In this case, the processing device 12 advances the processing to step S16.

In step S16, the processing device 12 determines whether an operation to the projector 1 by the user is absent for a predetermined time period from the start of the execution of the second mode or not. When an operation by the user is absent for the predetermined time period from the start of the execution of the second mode, the processing device 12 gives YES in step S16, that is, determines that an operation by the user is absent. In this case, the processing device 12 advances the processing to step S17. When an operation other than the operation to shift to the first mode is made by the user during the predetermined time period from the start of the execution of the second mode, the processing device 12 gives NO in step S16, that is, determines that an operation is made by the user. In this case, the processing device 12 advances the processing to step S14.

In step S17, the processing device 12 functions as the mode shift unit 128C and thus erases the message that "simultaneous vertex adjustment mode is in progress" displayed in the form of an OSD. The processing then shifts to step S11.

FIG. 17 is a flowchart explaining sub-steps forming the foregoing step S11.

In sub-step S21, the processing device 12 functions as the projection image generation unit 121 and thus acquires the first input image 20.

In sub-step S22, the processing device 12 functions as the projection image generation unit 121 and thus accepts position information representing the position of at least one vertex of the four vertices of the geometrically corrected projection image 21, based on an operation by the user.

In sub-step S23, the processing device 12 functions as the projection image generation unit 121 and thus corrects the position of at least one vertex of the four vertices of the first input image 20, based on the position information accepted in sub-step S22, and thereby generates the projection image 23.

In sub-step S24, the processing device 12 functions as the transformation formula decision unit 122 and thus decides a projective transformation formula, based on the position information about the four vertices of the first input image 20 and the position information about the four vertices of the geometrically corrected projection image 23.

FIG. 18 is a flowchart explaining sub-steps forming the foregoing step S14.

In sub-step S31, the processing device 12 functions as the information application unit 123B and thus applies the change information acquired by the change operation acceptance unit 123A to the first input image 20 and thereby generates the second input image 50, 70 or 80.

In sub-step S32, the processing device 12 functions as the coordinate decision unit 124 and thus executes projective transformation of the four vertices of the second input image 50, 70 or 80, using the projective transformation formula decided in sub-step S24. Thus, the processing device 12, as the coordinate decision unit 124, decides the coordinates prescribing the positions of the four vertices of the projection image 51, 71, or 81 corresponding to the four vertices of the second input image 50, 70 or 80.

In sub-step S33, the processing device 12 determines whether at least one vertex of the four vertices whose coordinates are decided in sub-step S32 is located outside the predetermined area 30 or not. When at least one vertex is located outside the predetermined area 30, the processing device 12 gives YES in sub-step S33, that is, determines that at least one vertex is located outside the predetermined area 30. In this case, the processing device 12 advances the processing to sub-step S34. When all the four vertices whose coordinates are decided in sub-step S32 are included in the predetermined area 30 on the liquid crystal panel, the processing device 12 gives NO in sub-step S33, that is, determines that all the four vertices are included in the predetermined area 30. In this case, the processing device 12 ends all the processing.

In sub-step S34, the processing device 12 functions as the adjustment amount control unit 126 and thus minimizes the unit amount of adjustment.

In sub-step S35, the processing device 12 functions as the information application unit 123B and thus applies the change information acquired by the change operation acceptance unit 123A and the unit amount of adjustment minimized by the adjustment amount control unit 126 to the first input image 20 and generates the second input image 50, 70 or 80.

In sub-step S36, the processing device 12 functions as the coordinate decision unit 124 and thus executes projective transformation of the four vertices of the second input image 50, 70 or 80, using the projective transformation formula decided in sub-step S35. Thus, the processing device 12, as the coordinate decision unit 124, decides the coordinates prescribing the positions of the four vertices of the projection image 51, 71 or 81 corresponding to the four vertices of the second input image 50, 70 or 80.

In sub-step S37, the processing device 12 determines whether at least one vertex of the four vertices whose coordinates are decided in sub-step S36 is located outside the predetermined area 30 or not. When at least one vertex is located outside the predetermined area 30, the processing device 12 gives YES in sub-step S37, that is, determines that at least one vertex is located outside the predetermined area 30. In this case, the processing device 12 advances the processing to sub-step S38. When all the four vertices whose coordinates are decided in sub-step S36 are included in the predetermined area 30 on the liquid crystal panel, the processing device 12 gives NO in sub-step S37, that is, determines that all the four vertices are included in the predetermined area 30. In this case, the processing device 12 ends all the processing.

In sub-step S38, the processing device 12 functions as the notification unit 127 and thus notifies the outside of the projector 1 of the result of the determination in sub-step S37.

3. Effects of Embodiment

In the control method according to the embodiment, the first mode execution unit 128A executes a first mode in which the shape of the first input image 20 is modified to generate the projection image 23. Then, the change operation acceptance unit 123A accepts a change operation to the first input image 20 for changing the size of the display image 52 or 72 or the position of the display image 52 or 72 on the display surface, during the execution of the first mode. When the change operation is accepted, the mode shift unit 128C shifts from the first mode to a second mode in which the change to the first input image 20 based on the change operation is controlled.

This configuration enables the user of the projector 1 to shift from the first mode to the second mode and, more specifically, from the mode for executing the geometric correction to the mode for executing the enlargement, reduction or movement of the display image 52 or 72 with a simple measure. Particularly, the shift to the second mode is made seamlessly, simply by having the change operation acceptance unit 123A accept the change operation to the first input image 20. Therefore, the user need not execute any procedures for mode selection.

The first mode includes individually controlling a plurality of control points included in the first input image 20 and thus modifying the shape of the first input image 20. The second mode includes collectively controlling a plurality of control points included in the first input image 20 and thus controlling the change to the first input image 20.

According to this configuration, the user of the projector 1 need not individually control the control points one by one during the execution of the second mode. That is, the user of the projector 1 can execute the enlargement, reduction or movement of the display image 52 or 72 without having to execute any complex operation.

The mode shift unit 128C shifts to the first mode when the change operation is not made for a predetermined time period or when an operation to return to the first mode is accepted, during the execution of the second mode.

This configuration enables the user of the projector 1 to return to the first mode and precisely adjust each control point again, after adjusting the vertices as control points collectively and simultaneously in the second mode.

The mode shift unit 128C displays a selection menu for selecting the first mode as a first image in the form of an OSD. When the change operation acceptance unit 123A accepts the change operation in the state where the selection menu is displayed, the mode shift unit 128C shifts to the second mode.

This configuration enables the mode shift unit 128C to shift to the second mode even from the state prior to the execution of the first mode.

When the change operation acceptance unit 123A accepts the change operation, the mode shift unit 128C displays a second image showing that the current mode is the second mode, in the form of an OSD.

This configuration enables the user of the projector 1 to recognize that the second mode is being executed at the present time point, via the OSD.

The second image is displayed as superimposed on the first image or side by side with the first image.

According to this configuration, the mode shift unit 128C displays both the first image and the second image during the execution of the second mode. Therefore, simply by having the mode shift unit 128C control the on/off state of the display of the second image, the user of the projector 1 can recognize whether the first mode is being executed or the second mode is being executed at the present time point.

The projector 1 also has, for example, a particular function button on a remote controller attached to the projector 1, as an operating element directly giving an instruction to control at least one of the size of the display image 52 or 72 and the position of the display image 52 or 72 on the display surface. The change operation is an operation to this function button.

According to this configuration, operating the function button of the projector 1 enables direct control of at least one of the size of the display image 52 or 72 and the position of the display image 52 or 72 on the display surface.

When the change operation is accepted via the operation to the function button, the adjustment amount control unit 126 controls a unit amount of adjustment, which is an amount of adjustment per unit time of the size of the display image 52 or 72 or the position of the display image 52 or 72 on the display surface, according to a time length of the operation to the function button. The input image generation unit 123 adjusts the size of the display image 52 or 72 or the position of the display image 52 or 72 on the display surface, based on the time length and the unit amount of adjustment. When at least one vertex of the projection image 51 or 71 is located outside the predetermined area 30 on the liquid crystal panel due to the adjustment, the adjustment amount control unit 126 reduces the unit amount of adjustment.

This configuration enables the user of the projector 1 to enlarge or reduce the display image 52 or 72 or reduce the speed of the movement of the display image 52 or 72 without executing any additional operation, when the projection image 51 or 71 is expected to extend beyond the boundary of a predetermined range on the liquid crystal panel in the process of enlarging, reducing or moving the display image 52 or 72. Also, the user of the projector 1 can enlarge, reduce or move the display image 52 or 72 to the limit of the available correction range.

The projector 1 according to the embodiment is a projector 1 projecting a projection image on a display surface. The projector 1 includes: the storage device 13 storing the control program PR1; and the processing device 12. The processing device 12 reads out and executes the control program PR1 from the storage device 13 and thus executes a first mode in which the shape of the first input image 20 is modified to generate the projection image 23. The processing device 12 also accepts a change operation to the first input image 20 for changing the size of the display image 52 or 72 or the position of the display image 52 or 72 on the display surface, during the execution of the first mode. The processing device 12 shifts from the first mode to a second mode in which a change to the first input image 20 based on the change operation is controlled, when the change operation is accepted.

This configuration enables the user of the projector 1 to shift from the first mode to the second mode and, more specifically, from the mode for executing the geometric correction to the mode for executing the enlargement, reduction or movement of the display image 52 or 72 with a simple measure. Particularly, the shift to the second mode is made seamlessly, simply by having the change operation acceptance unit 123A accept the change operation to the first input image 20. Therefore, the user need not execute any procedures for mode selection.

What is claimed is:

1. A control method for a projector, the control method comprising:
    executing a first mode to generate a projection image projected onto a display surface by modifying a shape of an input image;
    accepting a change operation to the input image for changing a size of a display image displayed as the projection image is projected on the display surface or a position of the display image on the display surface, during the execution of the first mode; and
    shifting from the first mode to a second mode to control a change to the input image based on the change operation, when the change operation is accepted,
    wherein the first mode includes modifying the shape of the input image by individually controlling a plurality of control points included in the input image, and
    wherein the second mode includes controlling the change to the input image by collectively controlling the plurality of control points.

2. The control method for the projector according to claim 1, further comprising:
    shifting to the first mode when the change operation is not accepted for a predetermined time period or when an operation to return to the first mode is accepted, during the execution of the second mode.

3. The control method for the projector according to claim 1, further comprising:
    displaying a first image for selecting the first mode; and
    shifting to the second mode when an input of the change operation is accepted in a state where the first image is displayed.

4. The control method for the projector according to claim 3, further comprising:
    displaying a second image showing that a current mode is the second mode, when the change operation is accepted.

5. The control method for the projector according to claim 4, wherein
    the second image is displayed as superimposed on the first image or side by side with the first image.

6. The control method for the projector according to claim 1, wherein
    the projector has a remote controller to accept an instruction to control at least one of the size and the position, and
    the change operation is an operation to the remote controller.

7. The control method for the projector according to claim 6, further comprising:
    controlling a unit amount of adjustment, which is an amount of adjustment per unit time of the size or the position, according to a time length of the operation to the remote controller;
    adjusting the size or the position, based on the time length and the unit amount of adjustment; and
    reducing the unit amount of adjustment when at least one vertex of the projection image is located outside a predetermined area in a projection image generation device provided in the projector, due to the adjusting.

8. A projector comprising:
    a processing device configured to execute a program to cause the processing device to:
    execute a first mode to generate a projection image projected onto a display surface by modifying a shape of an input image,
    accept a change operation to the input image for changing a size of a display image displayed as the projection image is projected on the display surface or a position of the display image on the display surface, during the execution of the first mode, and
    shift from the first mode to a second mode to control a change to the input image based on the change operation, when the change operation is accepted,
    wherein the first mode includes modifying the shape of the input image by individually controlling a plurality of control points included in the input image, and
    wherein the second mode includes controlling the change to the input image by collectively controlling the plurality of control points.

* * * * *